C. W. STREEPER.
COMPRESSION COUPLING FOR SHAFTS.
APPLICATION FILED AUG. 10, 1909.

1,037,682.

Patented Sept. 3, 1912.

Witnesses
Harry L. Smith
Hamilton D. Turner

Inventor
Charles W. Streeper
by his Attorneys
Smith & Hagin

UNITED STATES PATENT OFFICE.

CHARLES W. STREEPER, OF MANHEIM, PENNSYLVANIA, ASSIGNOR TO BOND FOUNDRY & MACHINE COMPANY, OF PHILADELPHIA, PENNSYLVANIA, A CORPORATION OF PENNSYLVANIA.

COMPRESSION-COUPLING FOR SHAFTS.

1,037,682. Specification of Letters Patent. Patented Sept. 3, 1912.

Application filed August 10, 1909. Serial No. 512,182.

*To all whom it may concern:*

Be it known that I, CHARLES W. STREEPER, a citizen of the United States, residing in Manheim, Lancaster county, Pennsylvania, have invented certain Improvements in Compression-Couplings for Shafts, of which the following is a specification.

My invention relates to that class of compression couplings for shafts in which the meeting ends of the shafts to be coupled are surrounded by a reversely-tapered compression sleeve, the latter being acted upon by two compression rings internally tapered to correspond with the external tapers of the compression sleeve, whereby, when these rings are drawn toward each other, the compression sleeve will be contracted upon the shafts.

My invention relates especially to the construction of the compression rings and to the means for drawing the same toward each other on the compression sleeve, the purpose of my invention being to insure the application of substantially uniform pressure to all parts of the sleeve upon which the compression rings have their bearing. This object I attain in the manner hereinafter set forth, reference being had to the accompanying drawing, in which—

Figure 1:
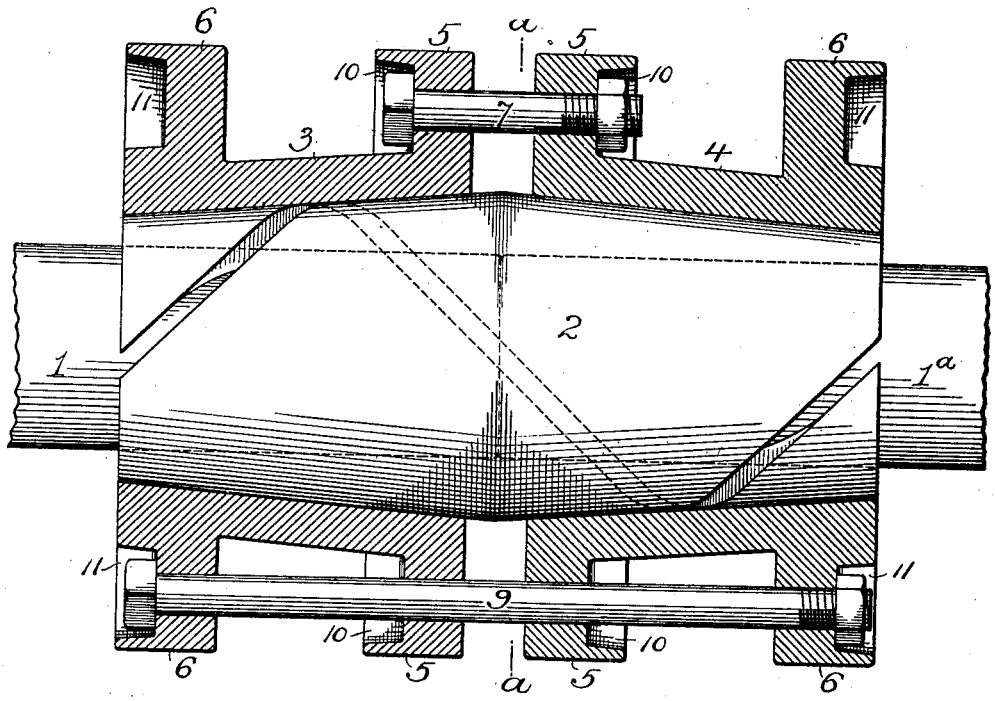
Figure 2:
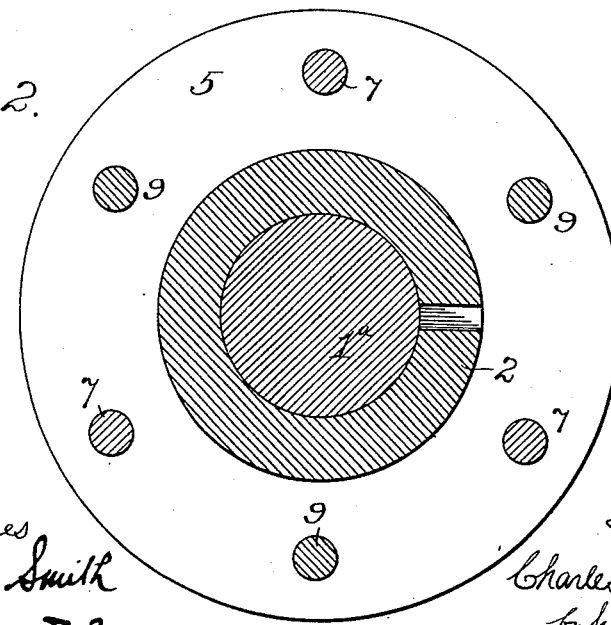

Figure 1 is a view, partly in side elevation and partly in vertical longitudinal section, of a compression coupling constructed in accordance with my invention, and Fig. 2 is a transverse section on the line *a—a*, Fig. 1.

In the drawing, 1, 1ª represent the adjoining end portions of two shafts which are to be coupled together, and 2 is a compression sleeve fitted upon the ends of said shafts and gradually reduced in diameter from the center toward each end so as to present reversely beveled or tapered external faces. This sleeve may be constructed in any desirable way in order to admit of compression upon the shafts. In the present instance it is provided for this purpose with a spiral slot in the manner set forth in the Letters Patent of R. W. Scott, No. 707,453, dated August 19, 1902.

Mounted upon and fitting snugly to one beveled face of the sleeve 2 is a ring 3 and mounted in a similar manner upon the opposite beveled face of the sleeve is a like ring 4, consequently when these rings are moved toward each other the sleeve 2 will be compressed upon the ends of the shafts and will couple the same together by reason of its frictional hold thereon, and when the rings 3 and 4 are moved apart from each other pressure upon the sleeve 2 will be relieved and the frictional hold of the sleeve upon the ends of the shafts will be lessened so as to permit said shafts to turn independently of each other or to be removed from the sleeve, as desired. Each of the rings 3 and 4 has, at its inner end, an annular flange 5 and at its outer end a similar annular flange 6, whereby said rings are rendered so stiff and rigid that spring of any part of the ring is effectually prevented, and the full wedging effect of the ring upon the compression sleeve is insured when said ring is moved inwardly upon the sleeve. The inner flanges 5 of the rings are perforated for the passage of a series of bolts 7 equidistantly disposed around the ring, as shown in Fig. 2, and each provided with a head and nut as shown in Fig. 1. Both the inner and outer flanges of the rings are perforated for the passage of a series of bolts 9, these bolts being likewise provided with heads and nuts and being alternated with the bolts 7, as shown in Fig. 2. By tightening the nuts upon the bolts 7 and 9 therefore pressure will be applied to each end of each ring, in order to force said rings inwardly upon the tapering ends of the compression sleeve, the presence of the bolts at each end of each ring further tending to increase the rigidity of said rings and prevent springing of the outer portions of the rings under the radial thrust to which they are subjected.

In order to shield and protect the heads and nuts of the bolts 7 and 9 and prevent contact of the same with the person or clothing of any one in the vicinity of the coupling the heads and nuts of the bolts 7 are contained in recesses 10 formed in the faces of the flanges 5 of the rings, and the heads and nuts of the bolts 9 are contained in recesses 11 formed in the faces of the flanges 6 of said rings, as shown in Fig. 1.

I claim:

The combination, in a compression coupling for shaft sections, of a reversely tapered and longitudinally slotted compression sleeve, compression rings applied to the tapered portions of the sleeve and each having, at each end, a projecting flange, bolts connecting the inner flanges of the rings to resist separation of the rings, and other bolts connecting the outer flanges of said rings to compress said tapered compression sleeve at the outer ends thereof.

In testimony whereof, I have signed my name to this specification, in the presence of two subscribing witnesses.

CHARLES W. STREEPER.

Witnesses:
HAMILTON D. TURNER,
KATE A. BEADLE.

Copies of this patent may be obtained for five cents each, by addressing the "Commissioner of Patents, Washington, D. C."